(12) United States Patent
Bloom et al.

(10) Patent No.: US 7,906,571 B2
(45) Date of Patent: Mar. 15, 2011

(54) WATERBORNE FILM-FORMING COMPOSITIONS CONTAINING REACTIVE SURFACTANTS AND/OR HUMECTANTS

(75) Inventors: Paul D Bloom, Decatur, IL (US); Teodora Tabuena-Salyers, Decatur, IL (US)

(73) Assignee: Archer Daniels Midland Company, Decatur, IL (US)

( * ) Notice: Subject to any disclaimer, the term of this patent is extended or adjusted under 35 U.S.C. 154(b) by 120 days.

(21) Appl. No.: 12/259,795

(22) Filed: Oct. 28, 2008

(65) Prior Publication Data

US 2010/0104884 A1 Apr. 29, 2010

(51) Int. Cl.
*C08K 5/06* (2006.01)
(52) U.S. Cl. ........................... 524/376
(58) Field of Classification Search ............ 524/376
See application file for complete search history.

(56) References Cited

U.S. PATENT DOCUMENTS

| | | | |
|---|---|---|---|
| 2,258,892 A | 10/1941 | Harris | |
| 2,284,127 A | 5/1942 | Bruson | |
| 3,575,904 A * | 4/1971 | Clarke | 524/533 |
| 3,637,774 A | 1/1972 | Babayan et al. | |
| 3,966,632 A | 6/1976 | Colliopoulos et al. | |
| 5,093,043 A | 3/1992 | Jakobson et al. | |
| 5,264,460 A | 11/1993 | Jakobson et al. | |
| 5,336,313 A | 8/1994 | Bunte et al. | |
| 5,424,469 A | 6/1995 | Jakobson et al. | |
| 5,484,849 A | 1/1996 | Bors et al. | |
| 5,498,659 A | 3/1996 | Esser | |
| 5,534,643 A | 7/1996 | Endou et al. | |
| 5,726,230 A | 3/1998 | Murata et al. | |
| 5,952,518 A | 9/1999 | Sugiura et al. | |
| 6,924,333 B2 | 8/2005 | Bloom et al. | |
| 7,119,133 B2 | 10/2006 | Vincent et al. | |
| 2004/0019141 A1 | 1/2004 | Bastelberger et al. | |
| 2004/0039095 A1 | 2/2004 | Van de Mark et al. | |
| 2004/0170658 A1 | 9/2004 | Charlier De Chily et al. | |
| 2006/0013928 A1 | 1/2006 | Steet et al. | |
| 2006/0020062 A1 * | 1/2006 | Bloom | 524/114 |
| 2006/0251775 A1 | 11/2006 | Anderson et al. | |
| 2009/0118397 A1 * | 5/2009 | Bloom | 524/13 |

FOREIGN PATENT DOCUMENTS

| | | |
|---|---|---|
| GB | 1007834 | 10/1965 |
| WO | WO 2006/004732 A1 | 1/2006 |

OTHER PUBLICATIONS

Fléche, G. and Huchette, M., "Isosorbide: Preparation, Properties and Chemistry," *Starch* 38:26-30, Wiley-VCH Verlag GmbH & Co. KGaA, Weinheim (1986).
*Handbook of Applied Surface and Colloid Chemistry*, Holmberg, K., ed., 1st ed., vol. 1, John Wiley & Sons, Ltd., p. 105 (2001).
Hockett, R.C. et al., "Hexitol Anhydrides. The Structure of Isosorbide, a Crystalline Dianhydrosorbitol," *J. Am. Chem. Soc.* 68:927-930, American Chemical Society (1946).
Linden, G. and Lorient, D., "Polyglycerol esters of fatty acids from lipid chemistry—fat substitutes," *New Ingredients in Food Processing*, pp. 297-298, Woodhead Publishing Limited (1999).
Scrimgeour, C., "Chemistry of Fatty Acids," *Bailey's Industrial Oil and Fat Products*, Shahidi, F., ed., 6th ed., vol. 1, John Wiley & Sons, Inc., pp. 12-13 (2005).
Wan, D. et al., Synthesis of Amphiphilic Hyperbranched Polyglycerol Polymers and Their Applications as Template for Size Control of Gold Nanoparticles, Journal of Applied Polymer Science, vol. 101, 509-514 (2006)).

\* cited by examiner

*Primary Examiner* — Ling-Siu Choi
*Assistant Examiner* — Hui Chin
(74) *Attorney, Agent, or Firm* — Scott Bloomer

(57) ABSTRACT

The present invention is directed to aqueous coating compositions, such as paints, containing a film-forming latex polymer and a reactive surfactant and/or a low VOC humectant. The reactive surfactant, a polyglycerol ester or ether of an unsaturated fatty acid, reduces or eliminates the need for traditional water-soluble additives that lower the water resistance of the dry coating. Additionally, the reactive surfactants of the invention are capable of oxidative cross-linking during the curing process, forming a dry film that is more durable and water-resistant than traditional latex paint composition. The low VOC humectant polyglycerol, isosorbide, or a derivative of isosorbide can replace at least in part traditional humectants such as propylene glycol which contribute to VOCs, while maintaining an effective open time for application of the aqueous coating compositions.

8 Claims, 3 Drawing Sheets

Adhesion to Aged Gloss Alkyd of ADM 11-1011 High Gloss Interior/Exterior White

WATERBORNE FILM-FORMING COMPOSITIONS CONTAINING REACTIVE SURFACTANTS AND/OR HUMECTANTS

FIELD OF THE INVENTION

The invention is directed to aqueous film-forming compositions containing a reactive surfactant and/or a humectant.

BACKGROUND OF THE INVENTION

Water-based latex paint is generally composed of an aqueous dispersion of pigments and latex particles that impart substrate hide, water resistance, and durability to the solid paint film. Other components such as dispersants, surfactants, and thickeners can be added to the liquid paint to maintain a stable dispersion and suspension of the pigments and latex particles. Solvents, bases, defoamers, and biocides can also be incorporated to improve liquid stability, application performance and film formation properties.

The chemical composition of water-based latex paints is designed to allow dispersion of components in water, yet maintain water resistance upon curing and forming a dry paint film. Essentially, the compositions are designed to contain a hydrophobic component for water resistance as a paint film, and a hydrophilic component to improve stability, solubility, and dispersion in the liquid aqueous phase.

Latex polymers are the film-forming portions of the paint film, and are prepared by an emulsion polymerization reaction. Aggregation of polymer particles is typically discouraged by including a stabilizing surfactant in the polymerization mix. In general, the growing latex particles are stabilized during emulsion polymerization by one or more surfactants such as an anionic or nonionic surfactant, or a mixture thereof. Examples of surfactants suitable for emulsion polymerization are given in *McCutcheon's Detergents and Emulsifiers* (MC Publishing Co., Glen Rock, N.J.) (2007 ed.). Generally, emulsion polymerization includes use of nonionic surfactants to create monomer micelles within the water phase.

Water-borne paint and coating formulations are among the most complex systems in surface and colloid chemistry. Surfactants are needed to reduce the free energy of the various interfaces of the system, thereby kinetically stabilizing these paint formulations. Commonly, surfactants are used as binder emulsifiers and as pigment dispersants. Additionally, surfactants are added to paint and coating formulations to improve wetting on low energy substrates, to control foaming during application and processing, and to prevent film defects caused by surface tension gradients. *Handbook of Applied Surface and Colloid Chemistry*, p. 105, Holmberg, K. (2001).

Nonionic surfactants, nonionic and anionic dispersants, nonionic thickeners, anionic alkali swellable thickeners, and water soluble cellulosic thickeners can be used in paint and coating compositions to separate, suspend and stabilize latex particles and pigment particles. Generally, the structures of these paint components contain a hydrophobic functionality synthetically combined with a hydrophilic functionality. Inorganic pigments are relatively heavy particles that would agglomerate and settle at the bottom of a container of latex paint without the use of anionic surfactants as well as various dispersants and thickeners for suspension.

Typically, surfactants, thickeners and dispersants are generally lower molecular weight components that remain in the paint film, which can significantly reduce water resistance and durability of the paint film. These components are required to maintain stability in the aqueous phase for in-can storage, but can compromise the end use function of a paint film.

In contrast to latex compositions, oil-based compositions, e.g., oil-based paints, commonly employ vegetable oils such as linseed oil or tung oil and/or vegetable oil co-reacted with other compounds (such as alkyd resins) as a component of the vehicle in the paint. The vegetable oils, which are also referred to in the art as "drying oils", form crosslinked films upon exposure to air. Like all vegetable oils, these drying oils are triesters of various fatty acids and glycerol (i.e. "triglycerides" or "triacylglycerols"). However, unlike most vegetable oils, the fatty acids in drying oils have a very high degree of unsaturation (high iodine value), are high in polyunsaturated fatty acids, and generally have a majority of fatty acids that contain 3 or more double bonds (such as, for example linolenic [cis-9-cis-12-cis-15-Octadecatrienoic] acid, eleostearic [cis-9-trans-11-trans-13-Octadecatrienoic] acid, and 4-Oxo-cis-9-trans-11-trans-13-Octadecatrienoic acid). Semi-drying oils have moderate to high degrees of unsaturation, and are high in polyunsaturated fatty acids, but contain lower levels of fatty acids that have 3 or more double bonds.

The use of such reactive drying oils in oil-based paint helps to provide a paint film which is hard and durable. Thus, the drying oils and co-reacted vegetable oil products (alkyds) are desirable components of oil-based compositions. However, oil-based compositions typically contain large proportions of volatile organic compounds ("VOC's") as solvents or additives, e.g., 380 to 450 grams per liter ("g/l") or more. Such high concentrations of VOC's are environmentally undesirable.

Latex compositions, on the other hand, typically contain lower concentrations of VOC's, e.g. less than about 250 g/l and thus are more environmentally compatible. Accordingly, it would be desirable to incorporate the drying oils of oil-based compositions into latex compositions to promote crosslinking of the latex compositions. However, the drying oils used in oil-based compositions are not water-soluble and accordingly cannot readily be used in latex compositions.

It would also be desirable to develop a latex paint formulation which incorporates components that can react during the curing process, and thereby help form a durable, water-resistant paint film. It would further be desirable to reduce the amounts of the water-soluble or water-sensitive components which provide emulsifying and rheologic properties in the can but also can contribute to poorer properties of the dry coating.

U.S. Pat. No. 6,924,333 ("the '333 patent") discloses a latex paint composition comprising polyunsaturated fatty acid-containing additives derived from vegetable oils. In one aspect, the '333 patent discloses a latex paint composition comprising a latex polymer and a polyunsaturated fatty acid moiety chemically attached to a glycol or a polyol through an ester, ether, or urethane linkage. The '333 patent further discloses that in a preferred embodiment, the glycol is ethylene glycol, diethylene glycol, 1,4-butanediol, propylene glycol, or 1,3-propane diol.

Although the compositions disclosed in the '333 patent may be suitable for particular latex compositions, it would be desirable to develop additional latex compositions having components that can react during the curing process and thereby help form a durable, water-resistant paint film.

Another component typically found in aqueous coating compositions, such as latex paints, is a humectant. A humectant is usually added to serve as both an antifreeze agent and to control the rate of evaporation from the coating film. Ethylene glycol is most commonly used, followed by propylene glycol.

As an antifreeze, the glycol depresses the freezing point of the aqueous medium. As water freezes, its volume expansion can push the latex particles together with sufficient force to cause coagulation by overcoming the stabilizing dispersant/surfactant layer. With a glycol added, even those paints or other coatings which become cold enough to freeze tend to freeze to a slush that exerts less force on the latex particles.

As a humectant, the glycol controls evaporation from the paint film to facilitate wet lapping. When paint is applied by roller or brush, each brush-full or roller-full of paint overlaps the wet edge of the preceding area of coverage. Without the glycol, evaporation can quickly leave the previously applied film edge very viscous, although very weak due to only limited latex coalescence. The brush or roller shear from the subsequent lapped application can break up this film, leaving irregularities along the lapped edge (Ciullo, P. A., Industrial Minerals and Their Uses—A Handbook and Formulary William Andrew Publishing/Noyes (1996)).

Although ethylene glycol and propylene glycol are suitable humectants for latex paints and other coatings, they contribute to VOC's. As VOC's are generally considered to be environmentally detrimental, it would be highly desirable to substitute ethylene glycol and propylene glycol at least in part with lower- or zero-VOC humectants in aqueous coating compositions.

BRIEF SUMMARY OF THE INVENTION

In one embodiment, the invention is directed to an aqueous coating composition comprising one or more film-forming latex polymers and a reactive surfactant. The reactive surfactant comprises one or more polyglycerol derivatives chosen from or selected from the group consisting of a polyglycerol ester and a polyglycerol ether of one or more unsaturated fatty acids.

The polyglycerol esters and ethers of polyunsaturated fatty acids reduce or eliminate the need for traditional water-soluble additives that lower the water resistance of the dry coating (e.g. paint) film. These reactive surfactants can replace petroleum-based derivatives such as nonylphenol ethoxlates (NPEs), which have faced much scrutiny for their long term environmental impact on water supplies and aquatic life.

Additionally, the polyglycerol esters and ethers of polyunsaturated fatty acids are capable of oxidative crosslinking during the curing process, forming a dry paint film that is more durable and water-resistant than traditional latex paint compositions. Furthermore, these moieties have good functionality, do not contribute to VOCs, and can be advantageously used in conjunction with and interact with other polyunsaturated components in a latex formulation such as reactive coalescents, reactive thickeners, and resins that include reactive sites such as acetoacetate functionality.

In another embodiment, the invention is directed to an aqueous coating composition comprising one or more film-forming latex polymers and a humectant. The humectant comprises one or more polyglycerols. Alternatively, the humectant may comprise isosorbide and/or a derivative thereof.

Polyglycerols, isosorbide, and derivatives of isosorbide can serve as zero-VOC humectants to help reduce levels of glycols such as propylene glycol in latex paints and other coatings to control evaporation and maintain open time.

DETAILED DESCRIPTION OF THE INVENTION

Figure 1A:
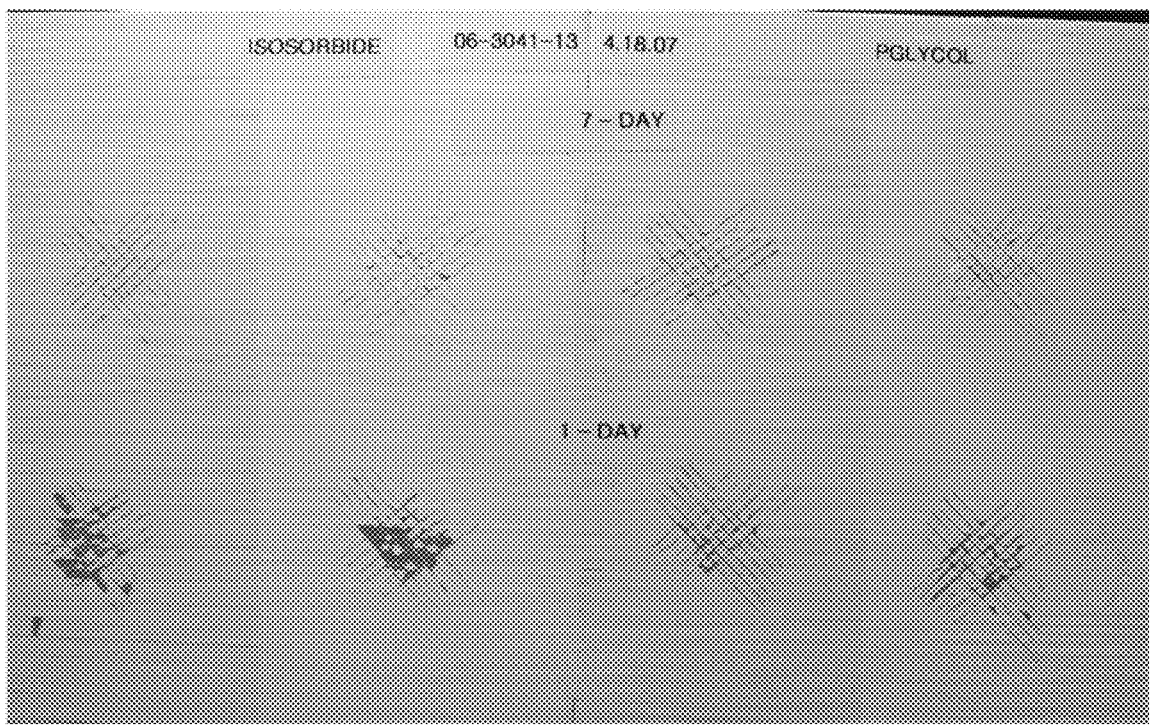
FIGS. 1a, 1b and 1c depict a comparison of adhesion of a high gloss interior/exterior white paint formulation containing isosorbide versus propylene glycol as a humectant, in accordance with Example 6.

In one embodiment, the invention is directed to an aqueous coating composition comprising one or more film-forming latex polymers and a reactive surfactant. The reactive surfactant comprises one or more polyglycerol derivatives chosen from or selected from the group consisting of a polyglycerol ester and a polyglycerol ether of one or more unsaturated fatty acids.

Another embodiment of the invention is directed to aqueous coating compositions containing a humectant having a reduced VOC content compared to those containing ethylene glycol or propylene glycol. The aqueous coating composition comprises (a) one or more film-forming latex polymers and (b) a humectant comprising one or more polyglycerols. Alternatively, the aqueous coating composition comprises (a) one or more film-forming latex polymers and (b) a humectant comprising isosorbide or a derivative thereof.

As used herein, the term "aqueous coating composition" is intended to encompass compositions containing an aqueous phase (e.g., water) that are applied to substrates. Illustrative coatings that can utilize the composition of the invention include wood coatings such as, e.g., stains, seal coat/sealers, topcoats, wiping stains, glazes, and fillers. Examples of other coatings include paints (e.g., house paints), primers, clear coatings, semi-gloss coatings, gloss coatings, architectural coatings, industrial coatings, maintenance coatings, general metal-type coatings, paper coatings including textile treatments, plastics coatings such as primers, base coats, top coats, and adhesion promoters, and polishes.

Other suitable types of coatings that are embodied by the aqueous coating compositions of the invention can be found in "Paint & Ink Formulations Database" by Earnest W. Flick, 2005; William Andrew—publisher; ISBN: 0815515081; *Paint and Surface Coatings: Theory and Practice*, $2^{nd}$ Ed. by R. Lambourne and T. A. Strivens, eds., 1999; William Andrew—publisher; ISBN: 18884207731; and "Organic Coatings: Science and Technology, $2^{nd}$ Ed; by Zeno W. Wicks et al, 1999; Wiley-Interscience; ISBN:0471245070, all incorporated by reference herein.

A "latex polymer" or "film-forming latex polymer" (used interchangeably herein) refers to a high molecular weight, film-forming component which imparts water resistance and durability to the dry coating film. Suitable latex polymers include polymerization and co-polymerization products of vinyl acetate, acrylic acid, methacrylic acid, styrene, alpha-methyl styrene, butadiene, acrylates, methacrylates, vinyl chloride, vinylidene chloride and acrylonitrile containing monomers.

For example, the latex polymers can be polymers or co-polymers of alkyl acrylates, alkyl methacrylates, styrene, and vinyl acetate. Examples of particularly suitable latex polymers include Neocar™ 2300 and UCAR® 625 (Dow Chemical Co., Midland, Mich.), and Airflex® EF811 (Air Products, Allentown, Pa.). Another monomer for copolymer production is ethylene, useful in the synthesis of ethylene-vinyl acetates.

A "reactive surfactant" is a molecule that typically has a long hydrophobic segment and a short ionizable and/or polar group. Unlike their non-reactive counterparts, a reactive surfactant additionally contains a reactive group on the hydrophobic segment that is capable of covalently bonding to the latex surface to facilitate curing and crosslinking.

In an embodiment, the reactive surfactant used in the aqueous coating compositions of the invention comprises a polyglycerol ester and/or a polyglycerol ether of one or more unsaturated fatty acids. As used herein, the phrase "polyglycerol ester and/or a polyglycerol ether of one or more unsaturated fatty acids" is intended to refer to a polyglycerol ester of one or more unsaturated fatty acids and/or a polyglycerol ether of one or more unsaturated fatty acids.

As used herein, the term "polyglycerol" (used interchangeably herein with "polyglyceryl") refers to "[o]ne of several mixtures of ethers of glycerol with itself, ranging from diglycerol to triacontaglycerol." *Hawley's Condensed Chemical Dictionary*, 14th Ed., John Wiley & Sons, Inc. (2002).

Examples of polyglycerols that can be used as part of the reactive surfactant include diglycerol, triglycerol, tetraglycerol, pentaglycerol, hexaglycerol, heptaglycerol, octaglycerol nonaglycerol, decaglycerol, pentadeca-glycerol and polyglycerols containing up to and including 30 repeat units of glycerol.

Polyglycerols can be produced by NaOH catalyzed condensation of glycerol at about 220° C. as disclosed by Linden & Lorient: "When hot and in the presence of a catalyst, glycerol dehydration under vacuum results in a mixture of polymerised glycerol." Linden, G. and Lorient, D., "Polyglycerol esters of fatty acids From Lipid chemistry—fat substitutes. New Ingredients in Food Processing," pp. 297-298, Woodhead Publishing (1999).

As used herein, the term "degree of polymerization" refers to the number of repeat units in an average polymer chain. The length is in monomer units. The polyglycerols used in the ester and ether reactive surfactants and humectants of the present invention can have a degree of polymerization of from about 2 to about 30. Each polyglycerol molecule can be substituted at one hydroxyl group on average (monosubstituted), two hydroxyl groups on average (disubstituted), or at more positions on average.

The degree of polymerization of the polyglycerol derivative may also be indicated by the "hydroxyl value." As used herein, the term "hydroxyl number" refers to the number of free hydroxyl groups per monomer unit.

Polyglycerol derivatives of the invention can have a hydroxyl number from about 0 to about 750. The molecular weight, hydroxyl number and hydroxyl value of selected polyglycerols are depicted in Table 1.

TABLE 1

| Glycerol Derivative | Molecular Weight | Hydroxyl Number | Hydroxyl Value |
|---|---|---|---|
| diglycerol | 166 | 4 | 1352 |
| triglycerol | 240 | 5 | 1169 |
| tetraglycerol | 314 | 6 | 1071 |
| pentaglycerol | 388 | 7 | 1012 |
| hexaglycerol | 462 | 8 | 970 |
| heptaglycerol | 536 | 9 | 941 |
| octaglycerol | 610 | 10 | 920 |
| nonaglycerol | 684 | 11 | 903 |
| decaglycerol | 758 | 12 | 880 |
| Pentadeca-glycerol | 1228 | 17 | 846 |

As used herein, the term "unsaturated" refers to "the state in which not all of the available valence bonds along an alkyl chain are satisfied." *Hawley's Condensed Chemical Dictionary*, 1151, 14th Edition (2002, by John Wiley & Sons, Inc.).

As used herein, the term "fatty acid" refers to "a carboxylic acid derived from or contained in an animal or vegetable fat or oil." *Hawley's* at p. 484.

The term "unsaturated fatty acids" encompasses polyunsaturated fatty acids. The unsaturated fatty acids, and particularly the polyunsaturated fatty acids, may contain conjugated sites of unsaturation. The polyunsaturated fatty acids or derivatives thereof may have been converted to or naturally contain conjugated sites of unsaturation.

Unsaturated fatty acids that can be used to form the polyglycerol ester and/or ether derivative can be derived from a variety of sources. For example, the unsaturated fatty acids can be derived from an animal fat or oil, a vegetable oil, a genetically modified vegetable oil, or a chemically or enzymatically modified vegetable oil. Methods for obtaining fatty acids from animal fats or oils and vegetable oils are well known in the art.

Useful animal fats and oils include any oil containing or comprising unsaturated fatty acids, such as animal fat, beef tallow, borneo tallow, butterfat, cod-liver oil, herring oil, lanolin, lard, milk fat, mowrah fat, mutton tallow, neat's foot oil, pile herd oil, sardine oil, tallow, whale oil, and derivatives, conjugated derivatives, genetically-modified derivatives and mixtures thereof.

Other sources of suitable unsaturated fatty acids include used cooking oils, float grease from wastewater treatment plants, animal fats such as beef tallow and pork lard, crude oils, "yellow grease," i.e., animal oils and fats that have been used or generated as a result of the preparation of food by a restaurant or other food establishment that prepares or cooks food for human consumption with a free fatty acid content of less than 15%, and white grease, i.e., rendered fat derived primarily from pork, and/or other animal fats.

The vegetable oil from which the unsaturated fatty acids can be derived is not particularly limited. For example, the vegetable oil can be camelina oil, canola oil, castor oil, cocoa butter, cocoa butter substitutes, coconut oil, coriander oil, corn oil, cottonseed oil, flax oil, hazelnut oil, hempseed oil, jatropha oil, kokum butter, linseed oil, mango kernel oil, marine oils, meadowfoam oil, menhaden oil, mustard oil, olive oil, palm oil, palm kernel oil, palm kernel olein, palm kernel stearin, palm olein, palm stearin, peanut oil, phulwara butter, pile herd oil, rapeseed oil, rice bran oil, safflower oil, sal fat, sardine oil, sasanqua oil, shea fat, shea butter, soybean oil, sunflower seed oil, tall oil, tsubaki oil, tung oil, triacylglycerols, diacylglycerols, monoacylglycerols, triolein, triglycerides of medium chain fatty acids, used cooking oils, yellow grease, other oils and derivatives, conjugated derivatives, genetically-modified derivatives or mixtures thereof.

For example, suitable vegetable oils include soybean oil, linseed oil, sunflower oil, corn oil, canola oil, rapeseed oil, cottonseed oil, peanut oil, tung oil, perilla oil, oiticica oil, castor oil, and safflower oil. More particularly, the polyunsaturated fatty acid moiety is derived from soybean or linseed oil.

The term "genetically modified vegetable oil" refers to an oil derived from a crop source that contains any gene alteration produced through genetic engineering techniques. Chemical or enzymatic modifications comprise any alteration of the physical or chemical properties of an oil, such as level of saturation, conjugation, or epoxidation.

In an embodiment, the reactive surfactant comprising the polyglycerol derivative is a polyglycerol ester of one or more unsaturated fatty acids. As used herein, the term "ester" refers to being "derived from an acid by the exchange of the replaceable hydrogen of the latter for an organic base." *Hawley's Condensed Chemical Dictionary*, 14th Ed., p. 451, John Wiley & Sons, Inc. (2002).

Polyglycerol esters that can be used in aqueous coating compositions of the invention include those having formula I:

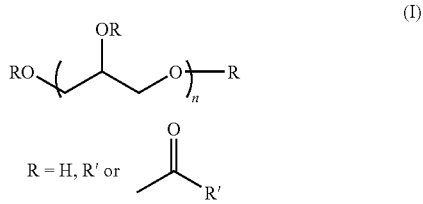

(I)

where in Formula I, n is preferably 2-30 and R' is preferably substituted or unsubstituted, saturated or unsaturated alkyl, alkenyl, alkynyl, alkylaryl, arylalkyl or derivatives thereof, and where at least one R is not H.

Alternatively, monochlorinated or monobrominated alkanes/alkenes or an epoxidized alpha olefin can react with polyglycerol to form esters.

The polyglycerol ester of an unsaturated fatty acid that can be used as a reactive surfactant in aqueous coating compositions of the invention is not particularly limited. For example, the polyglycerol ester can be one or more compounds including, but not limited to, decaglycerol monooleate, hexaglycerol monosoyate, diglyceryl monooleate, triglyceryl monooleate, tetraglyceryl monostearate, tetraglyceryl monooleate, decaglyceryl trioleate, decaglyceryl tristearate, decaglyceryl pentaoleate, hexaglyceryl monolaurate, hexaglyceryl monococoate, hexaglyceryl monomyristate, decaglyceryl monolaurate, and decaglyceryl monomyristate.

For example, the term "decaglycerol monooleate" refers to a polyglycerol monoester (i.e., decaglycerol) prepared from a mixture of fatty acids enriched in oleic acid. A "monooleate" refers to a number of predominantly oleic fatty acid groups esterified to a polyglycerol molecule varying around a central value of 1.

Similarly, the term "hexaglycerol monosoyate" refers to a polyglycerol (i.e. hexaglycerol) monoester prepared from the fatty acids typically found in soybean oil, and includes such a monoester wherein the unsaturated fatty acid(s) are derived from soybean oil. A "monosoyate" refers to a number of acid groups esterified with a polyglycerol molecule varying around a central value of 1.

The polyglycerol ester can also be polyglycerol monoesters of an unsaturated fatty acid derived from any of the fats and oils described above. Illustrative unsaturated fatty acids that can be esterified to the polyglycerol include 4-decenoic acid, caproleic acid, 4-dodecenoic acid, 5-dodecenoic acid, lauroleic acid, 4-tetradecenoic acid, 5-tetradecenoic acid, 9-tetradecenoic acid, palmitoleic acid, 6-octadecenoic acid, oleic acid, 9-octadecenoic acid, 11-octadecenoic acid, 9-eicosenoic acid, cis-11-eicosenoic acid, cetoleic acid, 13-docosenoic acid, 15-tetracosenoic acid, 17-hexacosenoic acid, 6,9,12,15-hexadecatetraenoic acid, linoleic acid, linolenic acid (18:3 n3), gamma linolenic acid (18:3 n6), β-eleostearic acid, gadoleic acid (20:1), β-eleostearic acid, punicic acid, 6,9,12,15-octadecatetraenoic acid, parinaric acid, 5,8,11,14-eicosatetraenoic acid, erucic acid, 5,8,11,14,17-eicosapentaenoic acid (EPA), 7,10,13,16,19-docosapentaenoic acid, 4,7,10,13,16,19-docosahexaenoic acid (DHA), and the like.

Polyglycerol esters can be synthesized as disclosed in U.S. Pat. Nos. 5,952,518 and 5,424,469, which are incorporated by reference herein. Polyglycerol esters can also be synthesized from polyglycerol and free fatty acids using a base catalyst or lipase as disclosed in U.S. Pat. No. 5,952,518.

Other well-known methods provided by Scrimgeour in "Chemistry of Fatty Acids," Bailey's Industrial Oil and Fat Products, Volume 1 page 12-13 (6th Edition. Edited by: Shahidi, Fereidoon © 2005 John Wiley & Sons) include the well-known routes of synthesis of esters from alcohols (such as polyglycerol and free fatty acids using an acid catalyst or a lipase.) In addition, Bailey's discloses that the fatty acid or alcohol groups present in an ester can be exchanged in a number of ways: by reaction with an excess of other fatty acids (acidolysis), alcohols (alcoholysis), or other esters (transesterification).

For example, conjugated linseed oils can be converted into fatty acid methyl esters by transesterification with methanol. Conjugated linseed oil fatty acid methyl esters (CLOFAME) can be reacted with polyglycerol to produce polyglycerol esters with high levels of substitution.

Partial esters of polyglycerols (i.e., glycerol polymers wherein only some of the alcohols have been esterified) with $C_8$ to $C_{22}$ fatty acids are also encompassed by the invention, and are generally prepared either via esterification of polyglycerols with corresponding saturated or unsaturated acids, or by trans-esterification of vegetable oils with polyglycerols.

Illustrative commercial products that are particularly useful as reactive surfactants in aqueous coating compositions of the invention are provided in Table 2 below.

TABLE 2

| Suitable polyglycerol esters of unsaturated fatty acids | |
|---|---|
| diglyceryl monooleate | NIKKO ® DGMO-90 |
| triglyceryl monooleate | DANISCO TS-T 122 |
| tetraglyceryl monostearate | NIKKO ® Tetraglyn 1-S |
| tetraglyceryl monooleate | NIKKO ® Tetraglyn 1-O |
| decaglyceryl trioleate | NIKKO ® Decaglyn 3-O |
| decaglyceryl tristearate | NIKKO ® Decaglyn 3-S |
| decaglyceryl pentaoleate | NIKKO ® Decaglyn 5-O |
| hexaglyceryl monolaurate | NIKKO ® Hexaglyn 1-L |
| hexaglyceryl monomyristate | NIKKO ® Hexaglyn 1-M |
| decaglyceryl monolaurate | NIKKO ® Decaglyn 1-L |
| decaglyceryl monomyristate | NIKKO ® Decaglyn 1-M |

In another embodiment of the invention, the polyglycerol derivative can be a polyglycerol ether of one or more unsaturated fatty acids. As used herein, the term "ether" refers to one of "a class of organic compounds in which an oxygen atom is interposed between two carbon atoms in the molecular structure." *Hawley's*, p. 453.

The polyglycerol ether of an unsaturated fatty acid for use in the aqueous coating compositions of the invention is not particularly limited, and can be derived from any of the oils described above.

Examples of unsaturated fatty acids which can be linked to polyglycerols through an ether bond to provide polyglycerol ethers useful for the invention can include 4-decenoic acid, caproleic acid, 4-dodecenoic acid, 5-dodecenoic acid, lauroleic acid, 4-tetradecenoic acid, 5-tetradecenoic acid, 9-tetradecenoic acid, palmitoleic acid, 6-octadecenoic acid, oleic acid, 9-octadecenoic acid, 11-octadecenoic acid, 9-eicosenoic acid, cis-11-eicosenoic acid, cetoleic acid, 13-docosenoic acid, 15-tetracosenoic acid, 17-hexacosenoic acid, 6,9,12,15-hexadecatetraenoic acid, linoleic acid, linolenic acid (18:3 n3), gamma linolenic acid (18:3 n6), β-eleostearic acid, gadoleic acid (20:1) β-eleostearic acid, punicic acid, 6,9,12, 15-octadecatetraenoic acid, parinaric acid, 5,8,11,14-eicosatetraenoic acid, erucic acid, 5,8,11,14,17-eicosapentaenoic acid (EPA), 7,10,13,16,19-docosapentaenoic acid, 4,7,10,13,16,19-docosahexaenoic acid (DHA), and the like.

Polyglycerol ethers can be synthesized as disclosed in U.S. Pat. No. 2,258,892, which is incorporated by reference herein in its entirety. Partial ethers of polyglycerols (i.e., glycerol polymers wherein only some of the alcohols have been etherified) with $C_8$ to $C_{22}$ fatty alcohols, are also encompassed by the invention, and are generally prepared via etherification of polyglycerols with fatty alcohols. Suitably, polyglycerols can also be etherified by fatty alcohols in the presence of a reagent such as epichlorohydrin.

Additionally, the aqueous coating compositions of the invention can further comprise of one or more additives, fillers, dispersants, surfactants, thickeners, solvents, bases, defoamers, biocides, pigments, or any combination thereof.

Thickeners, also referred to as rheology modifiers, have several roles in aqueous systems. They increase viscosity, maintain viscosity at required levels under specified processing conditions, provide improved stability, pigment suspension and application properties. Suitable thickeners include natural thickeners, such as, for example, casein, alginates, xanthan gum, gum tragacanth, and modified celluloses, such as methyl cellulose, hydroxyethyl cellulose, hydroxypropyl cellulose and carbomethoxy cellulose; and synthetic thickeners, such as various acrylic polymers, maleic anhydride copolymers, and polyethylenes.

Particularly suitable thickeners are reactive thickeners, as disclosed in U.S. Pat. No. 6,924,333, which is incorporated by reference in its entirety. For example, the reactive thickener can include a polyunsaturated fatty acid or derivative thereof chemically attached to polyethylene glycol, or to an anionic or cellulosic water-soluble polymer. The anionic and cellulosic water-soluble polymers and the polyunsaturated fatty acid or derivatives thereof disclosed in U.S. Pat. No. 6,924,333 are specifically contemplated herein.

Coalescent aids (or "coalescents") have been used in coatings to soften, i.e., plasticize, the particulate polymers and facilitate the formation of a continuous film with optimum film properties once the water has evaporated. In addition to increasing the ease of film formation, coalescent aids can also promote subsequent improvements in film properties by coalescing the particulate polymers and liquid pre-polymers and forming an integral film at ambient temperatures.

Coalescent aids are particularly helpful in assisting the formation of particulate polymer films possessing a high glass transition temperature, that is, the temperature which defines how easily the particles of the polymer diffuse at the temperature at which the film-forming composition is applied. The presence of coalescent aids in a particulate polymer film having a high glass transition temperature allows optimum film formation at ambient temperatures.

Illustrative coalescents include 2,2,4-Trimethyl-1,3-pentanediol Monoisobutyrate (TMB), available as Texanol™ ester alcohol (Eastman Chemical Co., Kingsport, Tenn.), benzoate esters (Velate 368, Velsicol Chemical Corporation, 10400 W. Higgins Road Suite 600, Rosemont, Ill. 60018-3713, USA) and petroleum based low-VOC coalescents Optifilm 400 and Optifilm 300—Eastman Chemical Co.; and phthalate plasticizers including dibutyl phthalate.

In an embodiment, aqueous coating compositions of the invention contain a reactive coalescent, such as those disclosed in U.S. Appl. Publ. No. 2004/0039095 A1, incorporated by reference in its entirety. For example, the reactive coalescent can be a glycol ester of an unsaturated fatty acid, particularly one which is derived from a vegetable oil, such as, for example, a propylene glycol monoester of vegetable oil fatty acids. Particularly suitable for use as a reactive coalescent is Archer RC™ (ADM Specialty Oils & Fats, Decatur, Ill.), which contains corn oil propylene glycol esters, predominantly propylene glycol monoesters of corn oil fatty acids (CAS Number 515152-38-2).

The dispersant can be composed of a polyunsaturated fatty acid moiety chemically attached to a glycol, wherein the dispersant contains a free hydroxyl or a carboxyl group, as disclosed in U.S. Pat. No. 6,924,333.

An additional embodiment of the invention is directed to a method of making an aqueous coating composition containing a reactive surfactant. The method comprises combining an aqueous latex film-forming polymer with a reactive surfactant comprising one or more polyglycerol derivatives selected from the group consisting of a polyglycerol ester and a polyglycerol ether of one or more unsaturated fatty acids, as described above. Methods of combining the polymer and the polyglycerol derivative to form the aqueous coating composition, along with optionally one or more additives, fillers, dispersants, surfactants, thickeners, solvents, bases, defoamers, biocides, pigments, or any combination thereof are well-known to those skilled in the art.

For example, if the coating composition is to be pigmented, at least one pigment can be dispersed in an aqueous medium under high shear such as is afforded by a COWLES® mixer or, in the alternative, at least one pre-dispersed pigment may be used. The emulsion polymer can be added under low shear stirring at the let down (completion) stage.

The polyglycerol esters and ethers of polyunsaturated fatty acids reduce or eliminate the need for traditional water-soluble additives that lower the water resistance of the dry coating (e.g. paint) film. These reactive surfactants can replace petroleum-based derivatives such as nonylphenol ethoxylates (NPEs), which have faced much scrutiny for their long term environmental impact on water supplies and aquatic life.

The polyglycerol esters and ethers of polyunsaturated fatty acids are capable of oxidative crosslinking during the curing process, forming a dry coating (e.g. paint) film that is more durable and water-resistant than traditional latex compositions. Furthermore, these moieties have good functionality, do not contribute to VOC, and can be advantageously used in conjunction with and interact with other polyunsaturated components in a latex formulation, such as reactive coalescents (e.g., Archer RC™), reactive thickeners (see U.S. Pat. No. 6,924,333), and resins that include reactive sites such as acetoacetate functionality (i.e., having one or more acetoacetate groups), allowing for the building of extended crosslinked networks (latent crosslinking) in latex paints and other coatings.

Another embodiment of the invention is directed to aqueous coating compositions containing a humectant having a reduced VOC content compared to conventional humectants, such as ethylene glycol or propylene glycol, which contribute to VOCs.

In one aspect, the aqueous coating composition comprises (a) one or more film-forming latex polymers and (b) a humectant comprising one or more polyglycerols.

As used herein, the term "humectant" refers to a substance having affinity for water with stabilizing action on the water content of the material. A humectant keeps the moisture content caused by humidity fluctuations within a narrow range.

Polyglycerols that can be used in the aqueous coating compositions of the invention include those discussed above that are used as part of a derivative for the reactive surfactant, such as diglycerol, triglycerol, tetraglycerol, pentaglycerol, hexaglycerol, heptaglycerol, octaglycerol nonaglycerol, decaglycerol, pentadeca-glycerol and polyglycerols containing up to and including about 30 repeat units of glycerol. Linear polyglycerols are preferably used.

The polyglycerols that that are used as humectants in the aqueous coating compositions of the invention can have a degree of polymerization of from about 2 to about 30.

The polyglycerol can be used in conjunction with a glycol such as propylene glycol or ethylene glycol. For example, aqueous coating compositions of the invention can contain a ratio of the one or more polyglycerols to a glycol, e.g. propylene glycol, of from about 1:99 to about 99:1 by weight.

The amount of polyglycerol humectant that is used in the aqueous coating compositions of the invention is not particularly limited. Typically, the polyglycerol is used in an amount effective to achieve an open time of about 5 to about 30 minutes, suitably from about 5 to about 15 minutes, when the composition is applied to a substrate. For example, the one or more polyglycerols are present in an amount of from about 0.1 to about 20% by weight of the composition.

The term "open time" refers to the time during which the aqueous coating composition remains workable when applied to a surface. Typically, aqueous coating compositions (e.g. paints) have a sufficient amount of open time to re-brush or re-roll over a freshly coated wet surface to improve its surface appearance or to apply additional paint onto the freshly coated surface without causing such defects as brush marks, lap lines resulting from differences in paint thickness, and loss of gloss.

Another embodiment of the current invention includes a method of preparing a humectant-containing aqueous coating composition. The method comprises combining an aqueous film-forming latex polymer with a humectant comprising one or more polyglycerols. The one or more polyglycerols are typically present in an amount effective to achieve an open time of 5 to about 30 minutes, suitably from about 5 to about 15 minutes, when the composition is applied to a substrate.

Isosorbide or a derivative thereof can also be used a humectant in aqueous coating compositions to provide suitable paint and coating performance with reduced VOC content compared to conventional humectants, such as propylene glycol. Accordingly, in another embodiment, the invention includes an aqueous coating composition comprising (a) one or more film-forming latex polymers and (b) a humectant comprising isosorbide or a derivative thereof.

The term "isosorbide" refers to 1,4,3,6-dianhydrosorbitol, which is obtained by dehydration of sorbitol and therefore can be considered as a valuable product from biomass (*Starch*, Fleche, G. and Huchette, M., 38:1, 26-30 (1986)).

The term "isosorbide derivative" refers to esters and ethers of isosorbide, ethoxylated isosorbides or polyglycerol esters of isosorbide. Suitable derivatives of isosorbide include dimethyl isosorbide, diacetyl isosorbide, and mixtures thereof.

The amount of isosorbide or derivative thereof used as a humectant in the aqueous coating compositions of the invention is not particularly limited. Typically, the polyglycerol is used in an amount effective to achieve an open time of about 5 to about 30 minutes, suitably from about 5 to about 15 minutes, when the composition is applied to a substrate. For example, the isosorbide or derivative thereof is present in an amount of from about 0.1 to about 20% by weight of the composition.

Another embodiment of the current invention includes a method of preparing a humectant-containing aqueous coating composition. The method comprises combining an aqueous film-forming latex polymer with a humectant comprising one or more of isosorbide or a derivative thereof. The one or more of isosorbide or a derivative thereof are typically present in an amount typically in an amount effective to achieve an open time of about 5 to about 30 minutes, suitably from about 5 to about 15 minutes, when the composition is applied to a substrate.

Polyglycerols are polymers having an average molecular weight. They comprise a distribution with the number average identified as the compound—hexaglycerol may comprise, for example, a mixture of polyglycerols ranging from diglycerol to octaglycerol: the average molecular weight would be that of hexaglycerol, and hexaglycerol would comprise the preponderance of the mixture.

Polyglycerol, isosorbide, and/or isosorbide derivatives can be used to extend the open time of an aqueous coating composition. Thus, another embodiment of the invention includes a method for extending the open time of an aqueous coating composition, comprising (a) forming an aqueous coating composition comprising at least one film-forming latex polymer; and (b) combining with the coating composition a humectant selected from the group consisting of (i) one or more polyglycerols and (ii) one or more of isosorbide or a derivative thereof in an amount effective to extend the open time of the coating composition. The open time of the aqueous coating composition can be extended (compared to a composition not containing a humectant) from about 5 minutes to about 30 minutes, suitably from about 5 to about 15 minutes.

Additionally, the humectant-containing aqueous coating compositions of the invention can further comprise of one or more additives, fillers, dispersants, surfactants, thickeners, solvents, bases, defoamers, biocides, pigments, or any combination thereof, including all of those described in connection with the aqueous coating compositions comprising a reactive surfactant, as described above.

The invention is also directed to a method for reducing the VOC content of an aqueous coating composition comprising one or more film-forming latex polymers and a humectant without substantially reducing open time of the composition when applied to a substrate. The method comprises combining the one or more film-forming latex polymers used in the aqueous coating composition with a humectant selected from the group consisting of (i)one or more polyglycerols and (ii) one or more of isosorbide or a derivative thereof.

Polyglycerol, isosorbide, and derivatives of isosorbide can serve as zero-VOC humectants to help reduce levels of glycols such as propylene glycol in latex paints and coatings without sacrificing control of evaporation or maintenance of open time. Thus, in another embodiment, the invention is directed to a method for method for reducing the VOC content of an aqueous coating composition comprising one or more film-forming latex polymers and a humectant without substantially reducing open time of the composition when applied to a substrate. The method comprises combining the one or more film-forming latex polymers used in the aqueous coating composition with a humectant selected from the group consisting of (i) one or more polyglycerols and (ii) one or more of isosorbide or a derivative thereof.

The aqueous coating compositions of the invention are particularly suitable for coating substrates. Thus, in embodiments, methods of the invention comprise providing an aqueous coating composition of the invention (for example, a composition comprising one or more film-forming latex polymers and a reactive surfactant comprising one or more polyglycerol derivatives chosen from a polyglycerol ester and a polyglycerol ether of one or more unsaturated fatty acids, or a composition comprising a humectant such as polyglycerol, isosorbide, or an isosorbide derivative) and applying the composition to the substrate.

Methods of application of the aqueous compositions to a substrate include, but are not limited to, brushing, rolling, and spraying methods such as, for example, air-atomized spray, air-assisted spray, airless spray, high volume low pressure spray, and air-assisted airless spray.

The aqueous compositions of the invention are particularly useful for and intended for application to a substrate, to produce articles of manufacture with the composition applied and coated thereto. Illustrative substrates to which the compositions of the invention can be applied include wood, composites, textiles and nonwovens, paper, exterior siding, sheetrock, metal, plastics, cementitious substrates such as, for example, concrete, stucco, and mortar, previously painted or primed surfaces, and weathered surfaces and any other substrate for which a coating might be useful.

Although the aqueous compositions of the invention are particularly useful as coating compositions, they can also be used a variety of other applications, such as adhesives, polymers, inks, and in composite technology.

EXAMPLES

Example 1

Synthesis of Conjugated Fatty Acid Methyl Esters

Highly reactive polyglycerol esters were synthesized from linear decaglycerol (Brose Chemical Company, Twin Falls, Id.) and fatty acid methyl esters of conjugated linseed oil (CLOFAME). Archer 1 (Archer-Daniels-Midland Co., Decatur, Ill.) is a commercially available CLOFAME.

Archer 1 (250 g), anhydrous methanol (200 mL, Aldrich) and sodium methoxide (1.5 g, Aldrich) were added to a 1000 mL round bottom flask and heated under reflux for 4 hours. The reaction mixture was then cooled to room temperature, poured into a separatory funnel, and allowed to separate into two layers. The lower glycerol and methanol layer was removed and the methyl ester layer was washed several times with hot water to remove fatty acids. The methyl ester layer was dried over anhydrous $MgSO_4$ and filtered to give a clear amber liquid at room temperature.

Example 2

Synthesis of Reactive Polyglycerol Esters

Linear decaglycerol (10.0 g, Brose Chemical Company, Twin Falls, Id.) and CLOFAME from Example 1 (40.0 g) were added to a 4-neck round bottom flask equipped with an overhead stirring apparatus, Barret style receiver, condenser. The two starting materials formed a biphasic system. The reaction mixture was heated to 160° C. under a nitrogen purge. At this temperature, anhydrous potassium carbonate (0.1 g) was added to the reaction. The reaction mixture was stirred for 4 hours at 165° C. with mechanical stirring and a strong nitrogen purge. The reaction was then cooled to room temperature and filtered. The resulting material was a clear, amber monophasic viscous liquid at room temperature, soluble in hexane and insoluble in water, indicating substantial esterification of polyglycerol.

Example 3

Evaluation of Paint Formulations

The performance of paint formulations containing polyglycerol esters such as decaglycerol monooleate (MONO), hexaglycerol monosoyate and decaglycerol monosoyate were compared with various nonyl phenyl ethoxylate (NPE) surfactants. Three formulations shown below using NPE-based surfactants were replaced with Decaglycerol Monooleate (MONO) from Lonza (Basel, Switzerland) on a lb-lb basis. The MONO was diluted with 30% Propylene glycol for easy incorporation. Formulations I and II were evaluated with Archer RC™ while Formulation III was evaluated both with Archer RC™ and Texanol™ coalescents. Basic paint and film properties were evaluated with emphasis on water and alkali resistance and color acceptance test.

TABLE 3

Types of Formulations Tested

I. E-2252 Good Quality Exterior Flat for Masonry (DOW)
   Tergitol ™ NP-9
II. E-2264 Exterior Semigloss (DOW)
   Triton ™ N-57
III. SGI-102 Low VOC Interior Semigloss (Air Products)
   Triton ™ CF-10

TABLE 4

Formulation I.: E-2252 Good Quality Exterior Flat for Masonry

| Raw Materials | lbs | % gal |
|---|---|---|
| Using HSD (high speed disperser - Stir Pak or Hockmeyer) mix two ingredients under low speed (200-300 rpm) until HEC is dissolved, about 15-20 minutes | | |
| Water | 199.90 | 24.05 |
| Cellosize ™ HEC QP 15,000 | 2.50 | 0.60 |
| Add following ingredients one at a time while mixing under low speed (200-300 rpm) about 5-10 minutes | | |
| KTPP | 2.00 | 0.25 |
| Nuosept ® 95 | 1.500 | 0.16 |
| Rhodoline ® 643 | 2.00 | 0.28 |
| Tergitol ™ NP-9[1] | 3.00 | 0.34 |
| AMP-95 | 1.00 | 0.13 |
| Tamol ® 850 | 7.00 | 0.69 |
| Add following pigments one at a time under low speed (400-600 rpm). Continue mixing until uniform. Increase the speed (1000-1300 rpm) to completely disperse the pigments to 3-4 NS fineness of grind (FOG), about 45-60 minutes | | |
| Ti-Pure ® R-902 | 220.00 | 6.62 |
| ZnO EPM-E | 25.00 | 0.54 |
| Snowflake ® CaCO3 | 100.00 | 4.45 |
| Minex ® 4 | 131.70 | 6.09 |
| Pre-wet HEC with enough amount of water and immediately add to the mill base. Add remaining water and continue to disperse until uniform with 3-4 NS fineness of grind (FOG), about 15 minutes | | |
| Water | 127.10 | 15.29 |
| Cellosize ™ HEC QP 15,000 | 2.30 | 0.55 |
| Add following ingredients one at a time under medium speed (800-1000 rpm) to complete the paint. Continue mixing to about 15 minutes | | |
| Propylene Glycol | 40.00 | 4.65 |
| Rhodoline ® 643 | 2.00 | 0.28 |
| Neocar ™ 2300 | 305.00 | 33.36 |
| Coalescent | 13.00 | 1.65 |
| Total | 1185.00 | 100.00 |
| Formulation Constant[2] | Archer RC ™ | Texanol ™ |
| Formula, lb/gal | 11.89 | 11.90 |

TABLE 4-continued

| | | |
|---|---|---|
| PVC | 45.70 | 47.82 |
| % TNV (wt-vol) | 56.46/38.71 | 55.37/37.02 |
| VOC g/l | 120.72 | 156.84 |
| Paint Properties Standard[3] | | |
| Viscosity, Krebs/ICI | 88-93 ku/0.8-1.0 p | |
| Gloss 60°/85° | 2/3 | |
| Scrub Cycles ASTM with shim, Failure | >3000 | |

[1]NPE replaced with Decaglycerol Monooleate (MONO)
[2]From Formulator ™ V 4.3.86 IM (Color-Tec)
[3]From Resin Supplier

TABLE 5

Formulation II: E-2264 Exterior Semigloss

| Raw Materials | lbs | % gal |
|---|---|---|
| Using HSD (high speed disperser-Stir Pak or Hockmeyer) add following ingredients one at a time while mixing under low speed (200-300 rpm), about 5-10 minutes | | |
| Water | 190.00 | 23.28 |
| UCAR ® Polyphobe ® 102 | 17.40 | 1.94 |
| Ammonia Water 28% | 1.80 | 0.24 |
| Propylene Glycol | 60.50 | 7.16 |
| Troysan ™ 586 | 1.80 | 0.2 |
| Tamol ® 1124 | 5.30 | 0.55 |
| Rhodoline ® 643 | 1.80 | 0.26 |
| Triton ™ N-57[1] | 2.10 | 0.25 |
| Add following pigments one at a time under low speed (400-600 rpm). Continue mixing until uniform. Increase the speed (800-1200 rpm) to completely disperse the pigments to 5-6 NS fineness of grind (FOG), about 20-30 minutes | | |
| Tronox ® CR-828 | 250.00 | 7.47 |
| Polygloss ™ 90 | 25.00 | 1.18 |
| Pre-mix the next two ingredients and add to above while mixing under low speed (400-600 rpm), about 5-10 minutes | | |
| Water | 5.50 | 0.67 |
| UCAR ® Polyphobe ® 102 | 4.40 | 0.49 |
| Add following ingredients one at a time under medium speed (600-800 rpm) to complete the paint. Continue mixing to about 15 minutes | | |
| Neocar ™ 2300 | 474.40 | 52.85 |
| Rhodoline ® 643 | 1.80 | 0.26 |
| Coalescent | 15.80 | 2.04 |
| Polyphase ™ AF-1 | 7.40 | 0.79 |
| Triton ™ GR-5M | 1.18 | 0.13 |
| Ammonia Water 28% | 1.80 | 0.24 |
| | | |
| Total | 1067.90 | 100.00 |
| Formulation Constant[2] | Archer RC ™ | Texanol ™ |
| Formula, lb/gal | 10.91 | 10.92 |
| PVC | 21.82 | 23.06 |
| % TNV (wt-vol) | 52.79/39.60 | 51.31/37.51 |
| VOC g/l | 170.32 | 211.62 |
| Paint Properties Standard[3] | | |
| Viscosity, Krebs/ICI | 99 ku/1.5 p | |
| Gloss, 60°/20° | 59.5/19 | |

[1]NPE replaced with Decaglycerol Monooleate (MONO)
[2]From Formulator ™ V 4.3.86 IM (Color-Tec)
[3]From Resin Supplier

TABLE 6

Formulation III. SGI-102 Low VOC Interior Semigloss

| Raw Materials | lbs | % gal |
|---|---|---|
| Using HSD (high speed disperser-Stir Pak or Hockmeyer) mix two ingredients under low speed (200-300 rpm) until Natrosol ® Plus 330 is dissolved, about 15-20 minutes | | |
| Water | 100.00 | 11.98 |
| Natrosol ® Plus 330 | 3.00 | 0.26 |
| Add following ingredients one at a time while mixing under low speed (200-300 rpm), about 5-10 minutes | | |
| Water | 97.00 | 11.62 |
| Tamol ® 1124 | 6.00 | 0.61 |
| AMP-95 | 2.50 | 0.32 |
| Strodex ® PK 90 | 2.00 | 0.21 |
| Triton ™ CF-10[1] | 2.00 | 0.22 |
| Drewplus ™ L-475 | 1.50 | 0.20 |
| Nuosept ® 95 | 1.50 | 0.16 |
| Add following pigments one at a time under low speed (400-600 rpm). Continue mixing until uniform. Increase the speed (800-1200 rpm) to completely disperse the pigments to 5-6 NS fineness of grind (FOG), about 45-60 minutes | | |
| Tiona ® 596 | 230.00 | 6.80 |
| Camel Wite | 30.00 | 1.33 |
| Attagel ® 50 | 5.00 | 0.30 |
| Add following ingredients one at a time under medium speed (600-800 rpm) to complete the paint. Continue mixing to about 15 minutes | | |
| Airflex ® EF811 | 228.00 | 25.52 |
| UCAR ® 625 | 246.40 | 28.31 |
| Coalescent | 13.00 | 1.64 |
| Drewplus ™ L-475 | 3.00 | 0.39 |
| Acrysol ® RM 2020NPR | 8.00 | 0.92 |
| Acrysol ® RM-825 | 2.00 | 0.22 |
| Water | 75.00 | 8.98 |
| | | |
| Total | 1055.9 | 100.00 |
| Formulation Constant[2] | Archer RC ™ | Texanol ™ |
| Formula, lb/gal | 10.55 | 10.56 |
| PVC | 22.91 | 24.00 |
| % TNV (wt-vol) | 50.90/37.93 | 49.67/36.24 |
| VOC g/l | 11.70 | 53.00 |
| Paint Properties Standard[3] | | |
| Viscosity, Krebs/ICI | 96.0 ku/0.90 p | |
| Gloss, 60°/20° | 47/11 | |
| Block Resistance ASTM D4946 | 8 (VG) | |

[1]NPE replaced with Decaglycerol Monooleate (MONO)
[2]From Formulator ™ V 4.3.86 IM (Color-Tec)
[3]From Resin Supplier The formulations had the following properties as shown in Table 7.

TABLE 7

Paint Properties:

| Paint Properties | E-2252 Exterior Flat for Masonry | | E-2264 Exterior Semi-gloss | | SGI-102 Low VOC Interior Semi-gloss | | | |
|---|---|---|---|---|---|---|---|---|
| | Archer RC + MONO | Archer RC + NPE | Archer RC + MONO | Archer RC + NPE | Archer RC + MONO | Archer RC + NPE | Texanol + MONO | Texanol + NPE |
| Wet paint film finish | rippling | rippling | rippling | less rippling | rippling better wet hide | slight tiny rippling | rippling better wet hide | smooth |
| Viscosity, Krebs (ku) | 90.1 | 88.7 | 80.6 | 82.8 | 93.4 | 105 | 91.8 | 99.9 |
| ICI (p) | 0.763 | 0.771 | 0.904 | 0.975 | 0.70 | 0.825 | 0.617 | 0.638 |
| Gloss @ | | | | | | | | |
| 20° | 1.3 | 1.6 | 12.1 | 18.1 | 9.9 | 6.8 | 9.5 | 7.1 |
| 60° | 2.5 | 2.5 | 52.5 | 62.6 | 44.1 | 38.6 | 44.4 | 39.8 |
| 85° | 3.0 | 3.0 | 92.8 | 95.4 | 79.6 | 79.4 | 77.3 | 17.6 |
| Opacity | 94.85 | 95.5 | 96.65 | 97.64 | 96.9 | 97.54 | 97.4 | 97.5 |
| Color Acceptance[1] Rub Up | | | | | | | | |
| Red Oxide | dE = 0.43 | dE = 0.42 | dE = 0.1 | dE = 0.21 | dE = 0.09 | dE = 0.05 | dE = 0.18 | dE = 0.21 |
| Thalo Blue | dE = 0.35 | dE = 0.34 | dE = 0.31 | dE = 0.32 | dE = 0.22 | dE = 0.30 | dE = 0.20 | dE = 0.41 |
| Block Resistance[2] ASTM D4946 RT | | | | | | | | |
| 1 day cure | 9 | 10 | 0 | 0 | 0 | 2 | 8 | 8 |
| 3 day cure | 10 | 10 | 9 | 3 | 4 | −4 | 8 | 8 |
| 7 day cure | 10 | 10 | 9 | 5 | 7 | 6 | 8 | 9 |
| 120° F. | | | | | | | | |
| 1 day cure | 8 | 9 | 0 | 0 | 0 | 0 | 4 | 4 |
| 3 day cure | 9 | 9 | 8 | 0 | 0 | 0 | −4 | 5 |
| 7 day cure | 10 | 10 | 9 | 1 | 6 | 5 | 6 | 6 |
| Heat-aged Stability 10 days @ 140° F. Gloss @ | | | | | | | | |
| 20° | 1.3 | 1.3 | 15.2 | 22 | 9.3 | 6.0 | 7.8 | 5.9 |
| 60° | 2.6 | 2.4 | 56.6 | 64.9 | 43.1 | 36.0 | 40.9 | 36.9 |
| 85° | 3.0 | 3.2 | 95.6 | 91.9 | 80.7 | 77.4 | 76.9 | 75.2 |
| $YE_{initial}$ | 2.74 | 2.88 | 2.78 | 3.69 | 3.62 | 3.69 | 3.80 | 3.73 |
| dYE | 0.50 | 0.5 | 1.00 | −0.08 | 0.11 | 0.18 | −0.01 | 0.21 |
| Scrub Cycles with shim ASTM D2486 | 3030 | 2210 | >5200 | >5200 | 1354 | 1510 | 1536 | 1348 |
| Alkali Resistance[3] 0.5% NaOH | 4 | 4 | 3 | 4 | 4 | 4 | 4 | 4 |
| Water Resistance[3] | 4 | 4 | 4 | 4 | 4 | 5 | 4 | 5 |

Key for Table 7:
[1] CIELab of Rub out portion with drawdown as standard
[2] 10 = Perfect; 0 = Very Poor
[3] 7 days immersion; 1 = Best; 5 = Poor For Formulation I, Both NPE and MONO based paint have same degree of surface imperfection. MONO gave a higher scrub resistance than NPE. Both gave equal color acceptance; and block, water and alkali resistance.

For Formulation II, MONO gave more rippling and slightly lower gloss than NPE. MONO has better color acceptance with Red Oxide than NPE. NPE gave a very poor block (Rate=0) resistance while MONO was excellent (Rate=9). No difference from NPE was seen on its water and alkali resistance.

For Formulation III, Archer RC™ and Texanol™ with MONO have better wet hide than using NPE. Archer RC+MONO has less scrub than Texanol™+MONO and Archer RC™+NPE, while Archer RC™+MONO has improved scrub resistance than Texanol™+NPE. NPE has better water resistance than MONO and equal alkali and block resistance.

Example 4

Performance of Paint Formulations Containing Reactive Surfactants

Three samples were prepared containing reactive surfactants according to the invention instead of NPEs. The samples were diluted with 30% Propylene Glycol for easy incorporation. Various properties of the formulations were evaluated.

TABLE 8

Formulation Ref: Modified SGI-102 Low VOC Interior Semigloss

| | 05-1201-2 | |
|---|---|---|
| Raw Materials | Lbs | % gal |

Using HSD (high speed disperser-Stir Pak or Hockmeyer) mix two ingredients under low speed (200-300 rpm) until Natrosol ® Plus 330 is dissolved, about 15-20 minutes

| Water | 100.00 | 11.98 |
| Natrosol ® Plus 330 | 2.80 | 0.25 |

Add following ingredients one at a time while mixing under low speed (200-300 rpm), about 5-10 minutes

| Water | 97.00 | 11.62 |
| Tamol ® 1124 | 6.00 | 0.61 |

TABLE 8-continued

| Ammonia Water 28% | 2.50 | 0.33 |
| Strodex ® PK-90 | 2.00 | 0.21 |
| Triton ™ GR 5M | 2.00 | 0.23 |
| Byk ® 1660 | 1.50 | 0.18 |
| Kathon ® LX 1.5% | 1.50 | 0.18 |

Add following pigments one at a time under low speed (400-600 rpm). Continue mixing until uniform. Increase the speed (800-1200 rpm) to completely disperse the pigments to 5-6 NS fineness of grind (FOG), about 45-60 minutes

| Tiona ® 596 | 230.00 | 6.80 |
| Camel Wite | 30.00 | 1.33 |
| Attagel ® 50 | 5.00 | 0.3 |

Add following ingredients one at a time under medium speed (600-800 rpm) to complete the paint. Continue mixing to about 15 minutes

| Water | 50.00 | 5.99 |
| Airflex ® EF811 | 218.00 | 24.41 |
| UCAR ® 625 | 240.00 | 27.59 |
| Archer RC ™ | 10.00 | 1.32 |
| Byk ® 1660 | 3.00 | 0.36 |
| Acrysol ® RM 2020NPR | 8.00 | 0.92 |
| Acrysol ® RM-825 | 1.90 | 0.21 |
| Water | 43.35 | 5.19 |
| Total | 1054.55 | 100.00 |

Formulation Constants

| VOC g/l | 13.23 | % TNV (wt-vol) | 49.81-36.45 |
| Formula, lbs/gal | 10.55 | PVC | 23.82 |

The formulations had the following properties as shown in Table 9.

TABLE 9

Paint Properties:

| Properties | | Standard GR 5M | Decaglycerol Monooleate | Hexaglycerol Monosoyate | Decaglycerol Monosoyate | Without PK 90 |
|---|---|---|---|---|---|---|
| Wet paint film finish | | Smooth | Smooth | Smooth | Smooth | Smooth |
| Viscosity, Krebs (ku) | | 94.3 | 81.5 | 82.20 | 83.0 | 81.50 |
| ICI (p) | | 0.542 | 0.529 | 0.50 | 0.508 | 0.479 |
| Gloss @ | 85° | 74.9 | 79.60 | 80.60 | 77.80 | 76.90 |
| | 60° | 38.3 | 48.10 | 47.40 | 47.90 | 46.70 |
| | 20° | 6.3 | 10.50 | 10.30 | 10.50 | 76.90 |
| Opacity | | 96.4 | 96.30 | 96.20 | 96.40 | 96.25 |
| Color Acceptance[1] Rub Up | | | | | | |
| Red Oxide | | dE = 0.10 | dE = 0.12 | dE = 0.18 | dE = 0.16 | dE = 0.22 |
| Thalo Blue | | dE = 0.25 | dE = 0.30 | dE = 0.33 | dE = 0.36 | dE = 0.35 |
| Block Resistance[2] ASTM D4946 | | | | | | |
| RT | 1 day cure | −8 | 9 | 9 | 9 | 8 |
| | 3 day cure | 8 | 8 | 9 | 9 | 5 |
| | 7 day cure | 8 | 8 | 9 | 9 | 3 |
| 120° F. | 1 day cure | −7 | 8 | 7 | 7 | 0 |
| | 3 day cure | −8 | 8 | 8 | 8 | 0 |
| | 7 day cure | 8 | 8 | 8 | 8 | 0 |
| Freeze-Thaw ASTM D2243 Cycle 1 | | Failed | Failed | Failed | Failed | Failed |
| Scrub Cycles ASTM D2486 | | 921 | 930 | 922 | 890 | 900 |

TABLE 9-continued

| Properties | Standard GR 5M | Decaglycerol Monooleate | Hexaglycerol Monosoyate | Decaglycerol Monosoyate | Without PK 90 |
|---|---|---|---|---|---|
| Alkali Resistance[3] (5% NaOH) | 1 | 1 | 2 | 4 | 3 |
| Water Resistance[3] | No change | No change | No change | No change | No change |

Paint Properties:

[1] CIELab of Rub out portion with drawdown as standard
[2] 10 = Perfect; 0 = Very Poor
[3] 7 days immersion; 1 = Best; 5 = Poor Results:

All three samples gave higher gloss than standard NPE containing formulations. Hexaglycerol and Decaglycerol monosoyate gave better block at room temperature. Standard and Mono gave the best alkali resistance followed by Hexaglycerol. There was not much difference on the color acceptance and scrub resistance.

Example 5

Evaluation of Polyglycerol With Propylene Glycol in a Paint Formulation

Linear decaglycerol (Brose Chemical Company, Twin falls, Id.) was used as a humectant to replace Propylene Glycol to decrease VOC in latex paint and increase open time to a sufficient level.

TABLE 10

Method:

1. Linear decaglycerol was diluted with 25% water for easy incorporation.
2. Formulation used was a semigloss paint.
3. Propylene Glycol was replaced with Linear decaglycerol as follows:
   a. 100% replacement
   b. 3 parts Propylene Glycol:1 part Polyglycerol
   c. 1 part Propylene Glycol:1 part Polyglycerol
   d. 1 part Propylene Glycol:3 parts Polyglycerol
4. Various properties were compared.

TABLE 11

Paint Formulation - ADM 30-1011

| Raw Materials | 1 part PG Standard | | 100% PolyG 05-1565-1 | 3 Parts PG 1 part PolyG 05-1565-2 | 1 part PG 1 Part PolyG 05-1565-3 | 1 Part PG 3 Parts PolyG 05-1565-4 | 1 Part PG 3 Parts PolyG 05-1565-5 | 1 Part PG 3 Parts PolyG 05-1565-6 | 1 Part PG 3 Parts PolyG 05-1565-7 |
|---|---|---|---|---|---|---|---|---|---|
| | lbs | gal | lbs | Lbs | lbs | lbs | lbs | lbs | lbs |
| Using HSD (high speed disperser-StirPak or Hockmeyer) add following ingredients one at a time while mixing under low speed (200-300 rpm), about 3-5 minutes | | | | | | | | | |
| Water | 70.00 | 8.39 | 70.00 | 70.00 | 70.00 | 70.00 | 70.00 | 70.00 | 70.00 |
| Kathon ® LX 1.5% | 1.75 | 0.21 | 1.75 | 1.75 | 1.75 | 1.75 | 1.75 | 1.75 | 1.75 |
| Propylene Glycol | 12.00 | 1.39 | — | 9.00 | 6.00 | 3.00 | 3.00 | 3.00 | 3.00 |
| Linear decaglycerol | | | 12.00 | 3.00 | 6.00 | 9.00 | 9.00 | 9.00 | 9.00 |
| Tamol ® 1124 | 5.00 | 0.51 | 5.00 | 5.00 | 5.00 | 5.00 | 2.50 | 2.50 | 2.50 |
| Add the pigment slowly. Continue mixing until uniform. Increase the speed (800-1200 rpm) to completely disperse the pigments to 5-6 fineness of grind (FOG), about 15-20 minutes. | | | | | | | | | |
| Omyacarb ® UF | 165.00 | 7.31 | 165.00 | 165.00 | 165.00 | 165.00 | 165.00 | 165.00 | 165.00 |
| Add under low speed and continue mixing till uniform (300-600 rpm), about 10 minutes | | | | | | | | | |
| Kronos ® 4311 Slurry | 260.00 | 13.33 | 260.00 | 260.00 | 260.00 | 260.00 | 260.00 | 260.00 | 260.00 |
| Add following ingredients one at a time under medium speed (600-800 rpm) to complete the paint. Continue mixing to about 15 minutes. | | | | | | | | | |
| Water | 60.00 | 7.19 | 60.00 | 60.00 | 60.00 | 60.00 | 60.00 | 60.00 | 60.00 |
| Rhoplex ® SG-30 | 440.00 | 51.18 | 440.00 | 440.00 | 440.00 | 440.00 | 440.00 | 440.00 | 440.00 |
| Archer RC ™ | 11.27 | 1.48 | 11.27 | 11.27 | 11.27 | 11.27 | 11.27 | 11.27 | 11.27 |

TABLE 11-continued

Paint Formulation - ADM 30-1011

| Raw Materials | 1 part PG Standard lbs | 1 part PG Standard gal | 100% 1 part PolyG 05-1565-1 lbs | 3 Parts PG 1 part PolyG 05-1565-2 Lbs | 1 part PG 1 Part PolyG 05-1565-3 lbs | 1 Part PG 3 Parts PolyG 05-1565-4 lbs | 1 Part PG 3 Parts PolyG 05-1565-5 lbs | 1 Part PG 3 Parts PolyG 05-1565-6 lbs | 1 Part PG 3 Parts PolyG 05-1565-7 lbs |
|---|---|---|---|---|---|---|---|---|---|
| Aerosol ® OT-75 | 1.50 | 0.16 | 1.50 | 1.50 | 1.50 | 1.50 | 1.50 | 0.75 | 0.00 |
| Byk ® 1660 | 2.06 | 0.24 | 2.06 | 2.06 | 2.06 | 2.06 | 2.06 | 2.06 | 2.06 |
| Ammonia Water 28% | 1.50 | 0.20 | 1.50 | 1.50 | 1.50 | 1.50 | 1.50 | 1.50 | 1.50 |
| Acrysol ® 2020NPR | 16.00 | 1.84 | 16.00 | 16.00 | 16.00 | 16.00 | 16.00 | 16.00 | 16.00 |
| Acrysol ® SCT-275 | 6.00 | 0.70 | 6.00 | 6.00 | 6.00 | 6.00 | 6.00 | 6.00 | 6.00 |
| Water | 48.98 | 5.87 | 48.98 | 48.98 | 48.98 | 48.98 | 50.55 | 51.28 | 51.98 |
| Total Formulation Constant | 1101.06 | 100.00 | 1101.06 | 1101.06 | 1101.06 | 1101.06 | 1100.13 | 1100.11 | 1100.06 |
| VOC (g/l) | 48.06 | | 14.04 | 39.55 | 31.05 | 22.54 | 22.60 | 22.62 | 22.64 |
| Lbs/gal | 11.01 | | 11.00 | 11.01 | 11.01 | 11.01 | 11.00 | 11.00 | 11.00 |
| % Solids by weight | 54.84 | | 55.94 | 55.12 | 55.39 | 55.67 | 55.58 | 55.53 | 55.48 |
| % Solids by volume | 40.26 | | 41.67 | 40.61 | 40.97 | 41.32 | 41.21 | 41.15 | 41.09 |
| PVC | 33.06 | | 31.94 | 32.77 | 32.49 | 32.21 | 32.30 | 32.35 | 32.39 |

The formulations had the following properties, as shown in Table 12.

TABLE 12

Paint Properties

| Properties | Standard 1 part PG | 100% PolyG 05-1565-1 | 3 Parts PG 1 part PolyG 05-1565-2 | 1 part PG 1 Part PolyG 05-1565-3 | 1 Part PG 3 Parts PolyG 05-1565-4 | 1 Part PG 3 Parts PolyG 05-1565-5 | 1 Part PG 3 Parts PolyG 05-1565-6 | 1 Part PG 3 Parts PolyG 05-1565-7 |
|---|---|---|---|---|---|---|---|---|
| Viscosity, ku | 103 | 106.5 | 103.8 | 104.3 | 105.2 | 108 | 111 | 119.4 |
| Viscosity, ku after overnight | 112.6 | 112.6 | 113.7 | 111.8 | 115.8 | | | |
| pH | 9.04 | 9.0 | 9.02 | 9.06 | 9.05 | 9.05 | 9.08 | 9.05 |
| Opacity | 96.11 | 96.74 | 96.44 | 96 | 96.25 | 95.90 | 95.35 | 96.50 |
| Gloss @ | | | | | | | | |
| 20 deg | 3.2 | 4.6 | 3.6 | 4.0 | 4.2 | 3.5 | 3.6 | 3.7 |
| 60 deg | 23.4 | 30.5 | 26.6 | 27.6 | 28.5 | 24.10 | 24.9 | 24.7 |
| 85 deg | 73.5 | 80.1 | 77.0 | 75.4 | 78.5 | 72.60 | 73.5 | 73.3 |
| VOC g/l | 48.06 | 14.04 | 39.55 | 31.05 | 22.54 | N/A | N/A | N/A |
| Reduction | | 70% | 17% | 35% | 53% | | | |
| Open Time[1], min | | | | | | | | |
| No line mark | 1 | 1 | 1 | 2 | 2 | N/A | N/A | N/A |
| Heavy line mark | 4 | 4 | 4 | 5 | 6 | | | |
| Sag, ASM-3 mils | 18 | 18 | 16 | 18 | 18 | N/A | N/A | N/A |

TABLE 12-continued

Paint Properties

| Properties | Standard 1 part PG | 100% PolyG 05-1565-1 | 3 Parts PG 1 part PolyG 05-1565-2 | 1 part PG 1 Part PolyG 05-1565-3 | 1 Part PG 3 Parts PolyG 05-1565-4 | 1 Part PG 3 Parts PolyG 05-1565-5 | 1 Part PG 3 Parts PolyG 05-1565-6 | 1 Part PG 3 Parts PolyG 05-1565-7 |
|---|---|---|---|---|---|---|---|---|
| Rating (1 = best) | 2 | 4 | 5 | 3 | 1 | | | |
| Block Resistance[2] ASTM D4946 RT | | | | | | | | |
| 1-day | 9 | 8 | 9 | 8 | 8 | 9 | 9 | 9 |
| 3-day | 9 | 9 | 9 | 9 | 9 | 9 | 9 | 9 |
| 7-day | 10 | 10 | 10 | 10 | 10 | 10 | 10 | 10 |
| 120° F. | | | | | | | | |
| 1-day | 2 | 0 | 1 | 0 | 0 | 1 | 3 | 4 |
| 3-day | 4 | 3 | 5 | 4 | 5 | 3 | 4 | 5 |
| 7-day | 9 | 8 | 8 | 8 | 8 | 9 | 9 | 9 |
| Alkali Resistance[3] (5% NaOH) (no blisters; only yellowish mapping; with capillary action) | 3 | 5 | 2 | 4 | 1 | Very poor with efflorescense | Very poor with efflorescense | Very poor with efflorescense |
| Water[3] (no blisters; no yellowish mapping; with capillary action) | All equal | All equal | All equal | All equal | All equal (Best) | No change | No change | No change |
| Scrub Cycles ASTM D2486 (% decrease) | 1900 | 1500 21% | 1700 10.5% | 1800 5.3% | 1575 17% | 1481 | 1385 | 1404 |

[1]Resin vendor in-house test procedure
[2]10 = Perfect; 0 = Very Poor
[3]7 days immersion 1 = Best; 5 = Poor Results: Polyglycerol, at 100% replacement, decreased scrub and block resistance at elevated temperatures and gave poor alkali resistance. A blend of 1 part Propylene Glycol and 3 parts Polyglycerol gave better open time, sag at 18 mils, and alkali resistance than the standard.

Decreasing the amount of surfactants and dispersant in the formulation, with 1 part Propylene Glycol and 3 parts Polyglycerol, improved the block resistance, but decreased scrub and gave a very poor alkali resistance.

Example 6

Evaluation of an Isosorbide Paint Formulation

Isosorbide was evaluated in Low VOC (<50 g/l) formulations, ADM 30-1011 Low Sheen Interior/Exterior White and ADM 11-1011 High Gloss Interior/Exterior White (with good adhesion to aged alkyd). The isosorbide sample was diluted with water at a 1:1 ratio by weight and was evaluated versus Propylene Glycol on a lb-lb basis. Basic paint properties were evaluated for baseline comparison.

TABLE 13A

Isosorbide Paint Formulation 1. Formulation constants were from Formulator ™ V 4.3.86 IM (Color-Tec)

| | ADM 30-1011 Low Sheen Interior/ Exterior White | |
|---|---|---|
| | lbs | gallons |
| Using HSD (high speed disperser-StirPak or Hockmeyer) add following ingredients one at a time while mixing under low speed (200-300 rpm), about 3-5 minutes | | |
| Water | 70.00 | 8.40 |
| Kathon LX 1.5% | 1.75 | 0.21 |
| Tamol 1124 | 5.00 | 0.51 |

TABLE 13A-continued

Add the pigment slowly. Continue mixing until uniform. Increase the speed (800-1200 rpm) to completely disperse the pigments to 5-6 fineness of grind (FOG), about 15-20 minutes

| | | |
|---|---|---|
| Omyacarb UF | 165.00 | 7.31 |

Add under low speed and continue mixing till uniform (300-600 rpm), about 10 minutes

| | | |
|---|---|---|
| Titanium Dioxide Kronos ® Slurry 4311 | 260.00 | 13.33 |

Add following ingredients one at a time under medium speed (600-800 rpm) to complete the paint. Continue mixing to about 15 minutes.

| | | |
|---|---|---|
| Propylene Glycol | 12.00 | 1.39 |
| Rhoplex SG-30 | 440.00 | 51.18 |
| Water | 60.00 | 7.20 |
| Aerosol OT-75 | 1.50 | 0.16 |
| Archer RC | 11.27 | 1.48 |
| Byk 1660 | 2.06 | 0.24 |
| Ammonia Water 28% | 1.50 | 0.20 |
| Acrysol SCT-75 | 6.00 | 0.70 |
| Acrysol RM 2020NPR | 16.00 | 1.84 |
| Water | 48.64 | 5.84 |
| Total | 1100.72 | 100.00 |
| Formulation Constants | | |
| VOC g/l | | 48.06 |
| Coalescent on Resin solid | | 5.12% |
| % Weight Solids | | 54.84 |
| % Volume Solids | | 40.26 |
| PVC | | 33.06 |

TABLE 13B

Isosorbide Paint Formulation 2. Formulation constants were from Formulator ™ V 4.3.86 IM (Color-Tec)

| | ADM 11-1011 High Gloss Interior/Exterior White | |
|---|---|---|
| Raw Materials | lbs | gallons |

Using HSD (high speed disperser-StirPak or Hockmeyer) add following ingredients one at a time while mixing under low speed (200-300 rpm), about 3-5 minutes

| | | |
|---|---|---|
| Water | 70.00 | 8.40 |
| Kathon LX 1.5% | 1.60 | 0.19 |
| Tamol 2001 | 2.70 | 0.30 |
| Byk 022 | 1.00 | 0.12 |
| AMP 95 | 0.50 | 0.06 |

Add the pigments slowly. Continue mixing until uniform. Increase the speed (800-1200 rpm) to completely disperse the pigments to 5-6 fineness of grind (FOG), about 15-20 minutes

| | | |
|---|---|---|
| Ti-Pure R-706 | 225.00 | 6.66 |
| Polygloss 90 | 10.00 | 0.46 |

Add following ingredients one at a time under medium speed (600-800 rpm) to complete the paint. Continue mixing to about 15-20 minutes.

| | | |
|---|---|---|
| Propylene Glycol | 7.75 | 0.90 |
| Rhoplex HG-700 | 600.00 | 67.82 |
| Water | 21.45 | 2.57 |
| Triton X-405 | 2.30 | 0.25 |
| Archer RC | 10.00 | 1.32 |
| Texanol | 8.00 | 1.01 |
| Water | 22.00 | 2.64 |
| Acrysol RM 2020NPR | 14.00 | 1.61 |
| Acrysol RM 8W | 3.00 | 0.34 |
| Byk 024 | 2.00 | 0.24 |
| Water | 42.47 | 5.10 |
| Total | 1043.77 | 100.00 |
| Formulation Constants | | |
| VOC g/l | | 49.55 |
| Coalescent on Resin solid % | | 6.67 |
| % Weight Solids | | 50.19 |
| % Volume Solids | | 37.51 |
| PVC | | 18.97 |

The properties of the paint formulations are provided in Table 14, below.

TABLE 14

Properties of isosorbide paint formulations

| | ADM 30-1011 Low Sheen Interior/Exterior White | | ADM 11-1011 High Gloss Interior/Exterior White | |
|---|---|---|---|---|
| | Isosorbide | Propylene Glycol | Isosorbide | Propylene Glycol |
| Viscosity, ku | 100.9 | 104.6 | 100.6 | 100 |
| Opacity Y | 96.55 | 96.91 | 96.76 | 97.08 |
| black Y | 87.40 | 88.12 | 88.44 | 89.07 |
| white | 90.52 | 90.93 | 91.40 | 91.75 |
| Yellowing Index | | | | |
| L | 96.38 | 96.36 | 96.81 | 96.81 |
| a | −1.36 | −1.37 | −1.44 | −1.45 |
| b | 1.49 | 1.47 | 1.69 | 1.68 |
| YE | 2.15 | 2.12 | 2.45 | 2.43 |
| Gloss @ 60 deg | 25.8 | 21 | 75.9 | 75.2 |

TABLE 14-continued

Properties of isosorbide paint formulations

| | ADM 30-1011 Low Sheen Interior/Exterior White | | ADM 11-1011 High Gloss Interior/Exterior White | |
|---|---|---|---|---|
| | Isosorbide | Propylene Glycol | Isosorbide | Propylene Glycol |
| Color Acceptance[1] | | | | |
| CIELab Red Oxide | No rub up | No rub up | No rub up | No rub up |
| da* | 0.15 | 0.21 | 0.16 | 0.13 |
| dE* | 0.192 | 0.25 | 0.233 | 0.194 |
| Thalo Blue | | | | |
| db* | 0.34 | 0.19 | 0.10 | 0.15 |
| dE* | 0.477 | 0.303 | 0.186 | 0.255 |
| LTC | With tiny cracks on edges on unsealed portion | passed | With 1-2 tiny cracks on edges on unsealed portion | passed |
| Block | | | | |
| 1-day | 0 | 1 | 9 | 9 |
| 3-day | 2 | 4 | 9 | 9 |
| 7-day | 5 | 6 | 10 | 10 |
| Open Time[2] | | | | |
| Wet Application | Better brushability | | Better brushability | |
| Sharp mark @ | 4 | 4 | 4 | 2 |
| Starts to be sticky @ | 6 | 5 | 6 | 4 |
| Stopped @ | 7 | 6 | 7 | 5 |
| After overnight dry | | | | |
| No mark @ | 1 | 1 | 1 | with mark at 1 |
| Sharp mark @ | 3 | 2 | 3 | 2 |
| Heat-aged Stability | | | | |
| In-can condition | Very slight syneresis | Very slight syneresis | No syneresis, creamy on top | No syneresis, creamy on top |
| Viscosity, ku | +5.70 | +2 | −3.40 | −3.00 |
| Gloss @ 60 deg | +2.2 | +1.1 | +2.0 | +1.2 |
| Yellowing Index, dYE | 0.50 | 0.48 | 0.50 | 0.51 |
| Freeze-thaw | | | | |
| Cycle 1 | Cottage cheese but softer than PGlycol | Cottage Cheese | 140.2 ku | 139.2 ku |
| Cycle 2 | | | 140.2 ku | 134.5 ku |
| Cycle 3 | | | 140.2 ku | 135.6 ku |
| Adhesion to aged gloss alkyd | | | | |
| 1 day curing | N/A | N/A | | |
| 1-coat | | | 1B 48% removal | 3B 10% removal |
| 2-coats | | | 1B 56% removal | 2B 24% removal |
| 7 day curing | | | | |
| 1-coat | | | 4B <5% removal | 4B <5% removal |
| 2-coats | | | 4B <5% removal | 4B <5% removal |
| Scrub Resistance, cycles failed | 2085 | 1750 | 573 | 720 |

Figure 1B:
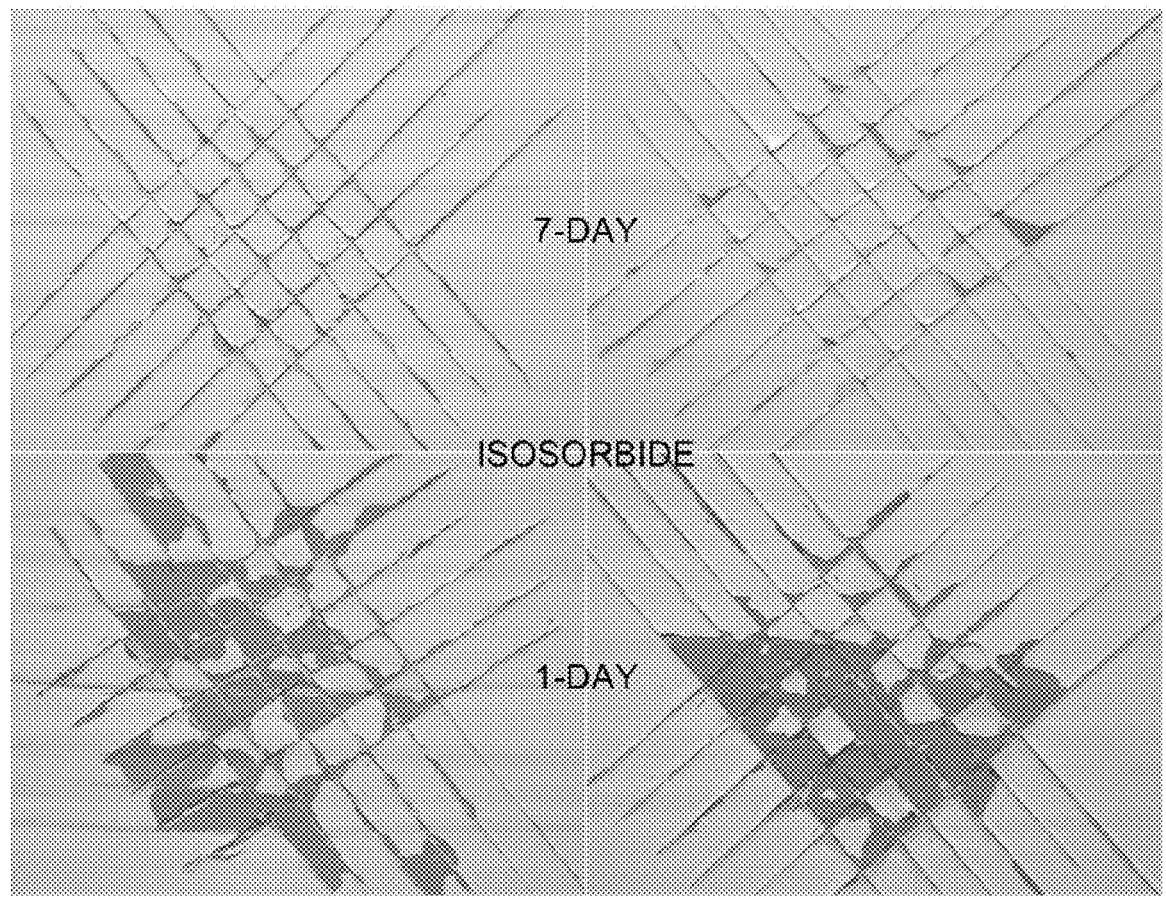
Figure 1C:
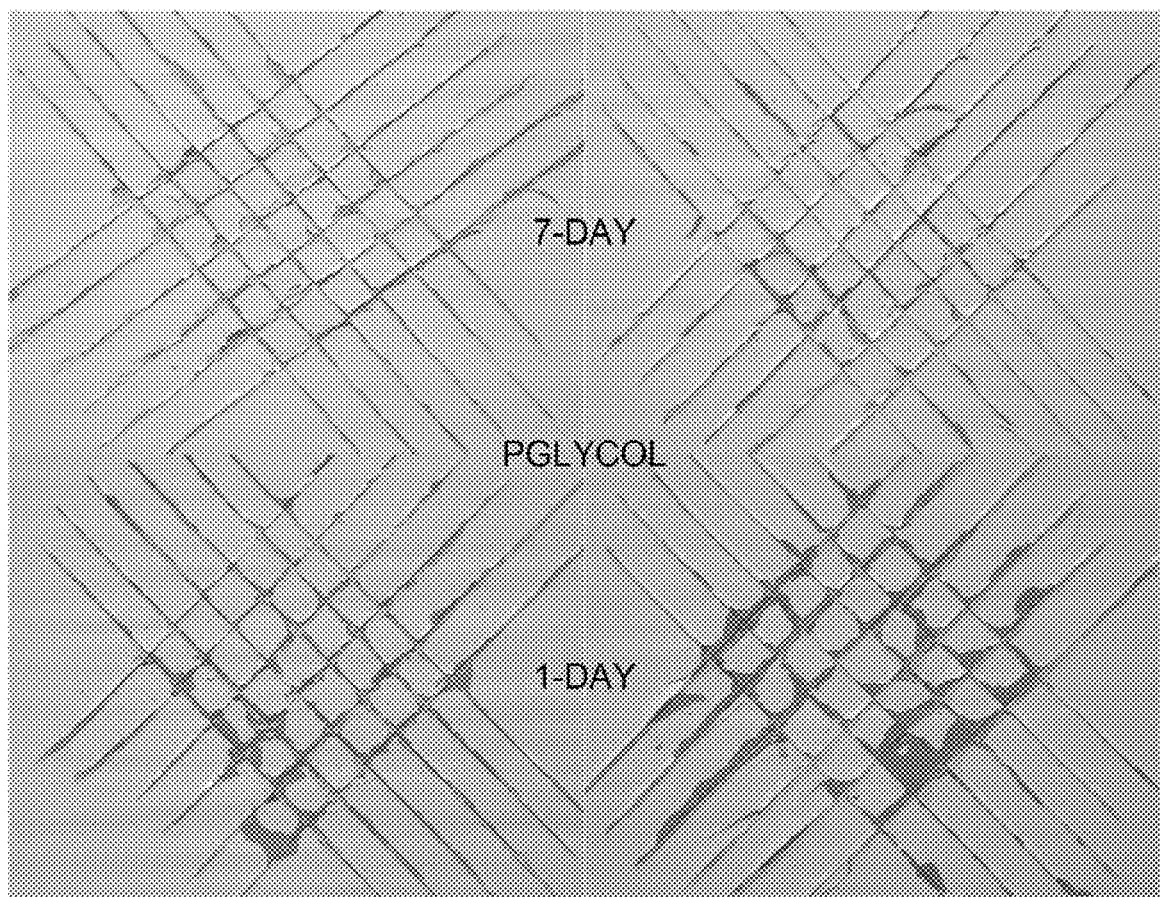

[1]Standard - Unrubbed Portion; Sample - Rubbed Portion
[2]Emulsion Vendor In-house Procedure Low temperature coalescing (LTC) of isosorbide paints in both formulations showed very tiny cracks on edges of unsealed portion of the Penopac paper which were not present with Propylene Glycol. However, it gave better scrub resistance but inferior block in Low Sheen Formulation. In both formulations, it gave higher gloss, better freeze-thaw resistance and better open time than Propylene Glycol. Adhesion to aged gloss alkyd surface at 1 day curing was not as good as Propylene Glycol but was better at 7-day curing, as shown in FIG. 1.

Based on the result of the evaluations, isosorbide can be used to improve the paint's ease of application, open time and freeze-thaw resistance. Isosorbide gave better scrub resistance in both formulations, and also gave higher gloss, better freeze-thaw resistance and better open time than Propylene Glycol.

TABLE 15

Raw Material Suppliers referenced by Examples

| Raw Materials | Function | Supplier |
|---|---|---|
| Acrysol ® RM-825 | Rheology modifier, Urethane based | Rohm and Haas |
| Acrysol ® SCT-275 | Rheology modifier, Urethane based | Rohm and Haas |
| Acrysol ® RM 2020NPR | Rheology modifier, Urethane based | Rohm and Haas |
| Acrysol ® RM 8W | Rheology modifier, Urethane based | Rohm and Haas |
| Aerosol ® OT-75 | Surfactant | Cytec |
| Airflex ® EF811 | Emulsion, Vinyl Acetate Ethylene | Air Products |
| Ammonia 28% | Neutralizer | Various |
| Ammonia Water 28% | Neutralizer | Various |
| AMP-95 | Neutralizer | DOW |
| Archer RC ™ | Coalescent | Archer Daniels Midland Co. |
| Attagel ® 50 | Rheology modifier, Attapulgite | Engelhard |
| Byk ® 022 | Defoamer | Byk-Chemie |
| Byk ® 024 | Defoamer | Byk-Chemie |
| Byk ® 1660 | Defoamer | Byk-Chemie |
| Byk ® 1660 | Defoamer | Byk-Chemie |
| Camel Wite | Extending Pigment, Calcium Carbonate | Imerys |
| Cellosize ™ HEC QP 15,000 | Rheology modifier, Hydroxyethylcellulose | DOW |
| Drewplus ™ L-475 | Defoamer | Drew Chemicals |
| Kathon ® LX 1.5% | In-can preservative | Rohm and Haas |
| Kronos ® Slurry 4311 | Hiding Pigment (76 ± 1% Titanium Dioxide in water) | Kronos |
| KTPP, Potassium Tripolyphosphate | Dispersant | Astaris |
| Minex ® 4 | Extending Pigment, Nepheline Syenite | Unimin |
| Natrosol ® Plus 330 | Rheology modifier, Modified Hydroxyethylcellulose | Hercules |
| Neocar ™ 2300 | Emulsion, Acrylic | DOW |
| | In-can preservative | Nuodex |
| Omyacarb ® UF | Extending Pigment, Calcium Carbonate | Omya |
| Polygloss ™ 90 | Extending pigment, Kaolin Clay | Huber |
| Linear decaglycerol | Humectant | Brose Chemical Company |
| Polyphase ™ AF-1 | Film preservative | Troy Chemicals |
| Propylene Glycol | Cosolvent | Various |
| Rhodoline ® 643 | Defoamer | Rhodia |
| Rhoplex ® HG-700 | Emulsion, Self-crosslinking Acrylic | Rohm and Haas |
| Rhoplex ® SG-30 | Emulsion, Acrylic | Rohm and Haas |
| Snowflake ® CaCO3 | Extending Pigment, Calcium Carbonate | Imerys |
| Strodex ® PK-90 | Surfactant | Dexter Chemicals |
| Tamol ® 2001 | Dispersant | Rohm and Haas |
| Tamol ® 1124 | Dispersant | Rohm and Haas |
| Tamol ® 850 | Dispersant | Rohm and Haas |
| Tergitol ™ NP-9 | Surfactant, NPE-based | DOW |
| Texanol ™ | Coalescent | Eastman |
| Tiona ® 596 | Hiding Pigment, Titanium Dioxide | Millenium Chemicals |
| Ti-Pure ® R-902 | Hiding Pigment, Titanium Dioxide | Dupont |
| Ti-Pure ® R-706 | Hiding Pigment, Titanium Dioxide | Dupont |
| Triton ™ CF-10 | Surfactant, NPE Based | DOW |
| Triton ™ GR-5M | Surfactant | DOW |
| Triton ™ N-57 | Surfactant, NPE Based | DOW |
| Triton ™ X-405 | Surfactant | DOW |
| Tronox ® CR-828 | Hiding Pigment, Titanium Dioxide | Kerr-Mcgee |
| Troysan ™ 586 | In-can preservative | Troy Chemicals |
| UCAR ® 625 | Emulsion, Acrylic | DOW |
| UCAR ® Polyphobe ® 102 | Rheology modifier, Urethane-alkali swellable | DOW |
| ZnO EPM-E | Zinc Oxide Film preservative | Umicore |

Having now fully described this invention, it will be understood to those of ordinary skill in the art that the same can be performed within a wide and equivalent range of conditions, formulations, and other parameters without affecting the scope of the invention or any embodiment thereof.

All documents, e.g., scientific publications, patents, patent applications and patent publications, if cited herein are hereby incorporated by reference in their entirety to the same extent as if each individual document was specifically and individually indicated to be incorporated by reference in its entirety. Where the document cited only provides the first page of the document, the entire document is intended, including the remaining pages of the document.

What is claimed is:

1. An aqueous coating composition comprising:
   (a) one or more film-forming latex polymers, and
   (b) a humectant comprising one or more polyglycerols,
   wherein said one or more polyglycerols are selected from the group consisting of diglycerol, triglycerol, tetraglycerol, pentaglycerol, hexaglycerol, heptaglycerol, octaglycerol, nonaglycerol, decaglycerol, linear decaglycerol, pentadeca-glycerol, linear polyglycerols, and polyglycerols containing up to and including 30 repeat units of glycerol.

2. The composition of claim 1, wherein the one or more polyglycerols are present in an amount effective to achieve an open time of about 5 to about 30 minutes when the composition is applied to a substrate.

3. The composition of claim 1, wherein the one or more polyglycerols are present in an amount of from about 0.1 to about 20% by weight of the composition.

4. The composition of claim 1, wherein said one or more polyglycerols are linear polyglycerols.

5. An aqueous coating composition comprising:
   (a) one or more film-forming latex polymers, and
   (b) a humectant comprising one or more polyglycerols;
   wherein said one or more polyglycerols are linear polyglycerols; and,
   wherein said one or more polyglycerols have a degree of polymerization from about 2 to about 30.

6. The composition of claim 1, wherein the humectant further comprises propylene glycol.

7. The composition of claim 6, wherein the humectant has a ratio of said one or more polyglycerols to propylene glycol of from about 1:99 to about 99:1 by weight.

8. A method of preparing the composition of claim 1, comprising combining an aqueous film-forming latex polymer with a humectant comprising one or more polyglycerols.

* * * * *